United States Patent [19]
Cropper et al.

[11] Patent Number: 5,180,530
[45] Date of Patent: Jan. 19, 1993

[54] VELOCITY PROFILE FOR CLAMP LOCKOVER

[75] Inventors: Dennis J. Cropper, Georgetown; James E. O'Bryan, Cincinnati; Susan Waits, Hillsboro, all of Ohio

[73] Assignee: Cincinnati Milacron, Inc., Cincinnati, Ohio

[21] Appl. No.: 705,831

[22] Filed: May 28, 1991

[51] Int. Cl.⁵ .............................................. B29C 45/80
[52] U.S. Cl. .................................. 264/40.5; 264/328.1; 425/150; 425/590; 425/593
[58] Field of Search ................... 264/40.1, 40.5, 328.7, 264/328.8, 328.11; 425/135, 149, 150, 451.5, 451.6, 575, 589, 590, 592, 593

[56] References Cited

U.S. PATENT DOCUMENTS 4,519,763  5/1985  Matsuda et al. ................. 425/451.2
4,917,840  4/1990  Harada et al. ....................... 425/150

*Primary Examiner*—Jill L. Heitbrink
*Attorney, Agent, or Firm*—Wood, Herron & Evans

[57] ABSTRACT

A close clamp cycle for an injection molding machine in which a toggle locking motion is executed using a plurality of velocities to permit faster clamp operation while maintaining control of the clamp to bring it quietly to its final position without damage to the machine.

5 Claims, 4 Drawing Sheets

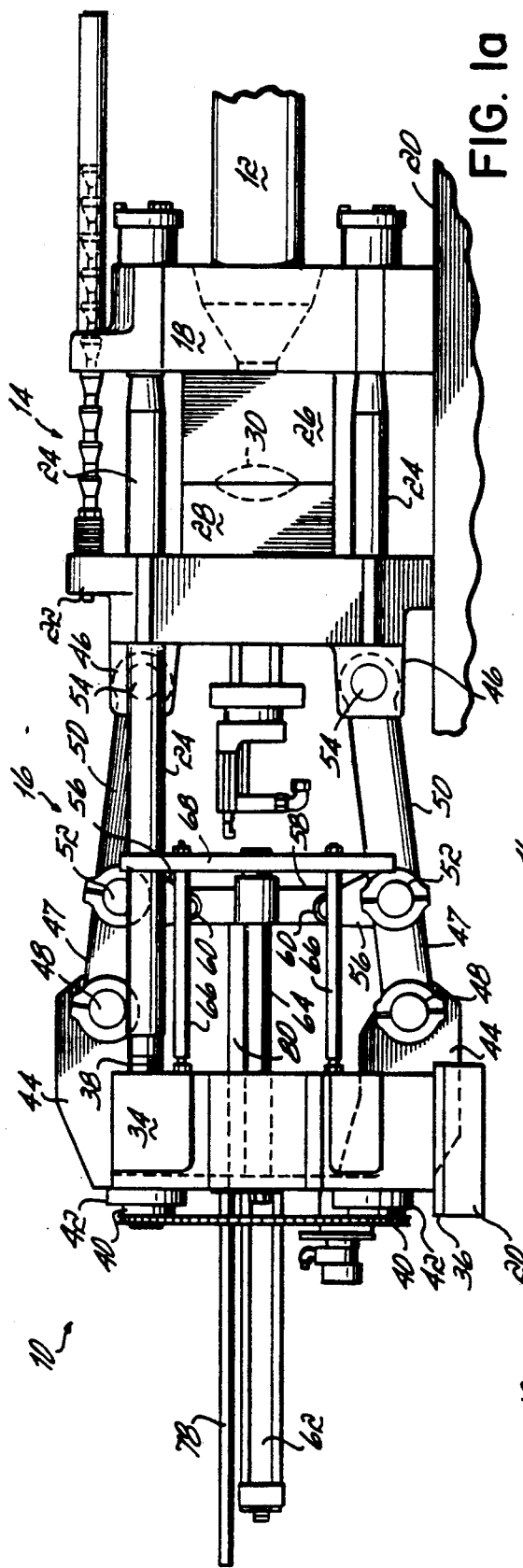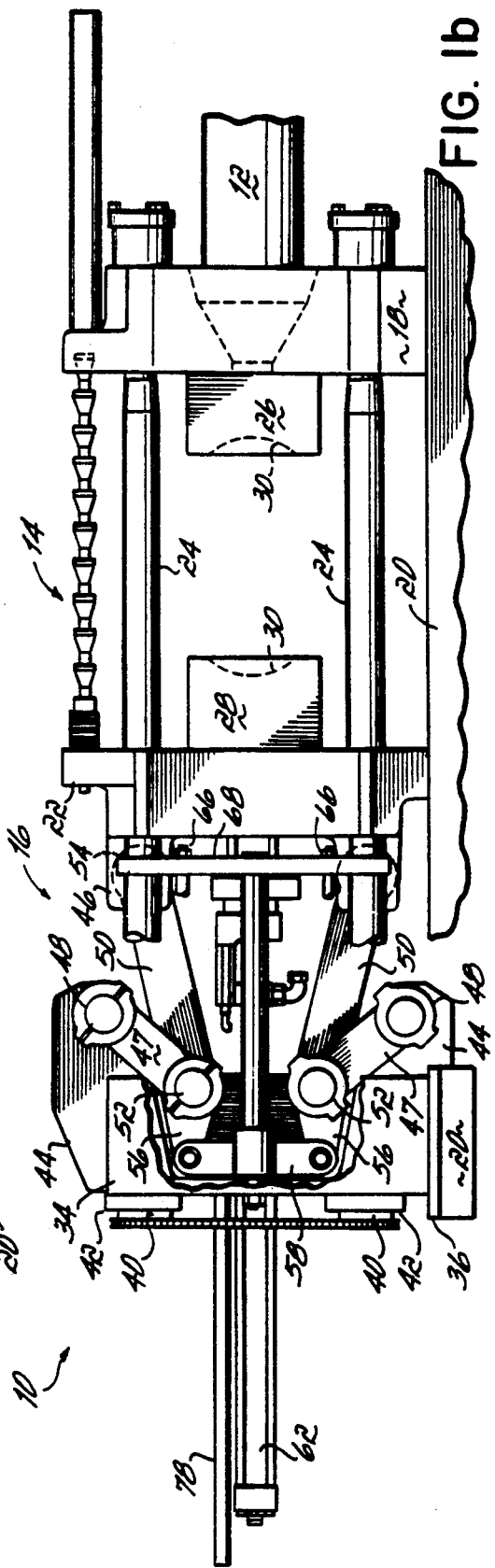

VELOCITY PROFILE FOR CLAMP LOCKOVER

BACKGROUND OF THE INVENTION

I. Field of Invention

This invention relates generally to the control of toggle type injection molding machinery. In particular, the invention provides an improved velocity control of a toggle clamp mechanism during toggle lockover.

II. Description of the Prior Art

Typically, the first step in an injection molding machine cycle of operation is to close and lock the clamp, i.e., to bring mold elements mounted on movable and stationary platens in a closed relationship under a predetermined clamping force. Generally, a toggle mechanism is connected to the movable platen and provides a mechanical advantage to a clamp actuator.

It is known to operate the clamp actuator and toggle mechanism and close the clamp according to a cycle of operation which is illustrated in FIG. 4a. FIG. 4a illustrates relative magnitudes of toggle mechanism velocity as a function of toggle mechanism position during a clamp close cycle. First, closure of the toggle clamp is initiated from an open position 200 at a predetermined high velocity as shown at 202. When the toggle mechanism reaches a predetermined position 204, the velocity is reduced to a lesser mold protect velocity 206 as shown at position 205. Toggle mechanism operation continues at the mold protect velocity to bring the platens and mold elements together. When the toggle mechanism reaches a mold touch position 208 at which point the mold elements are in a contacting relationship, the operation of the toggle mechanism is continued at a low velocity 210 until it achieves a locked position 212 at which point the toggle mechanism has an optimal mechanical configuration to resist mold separating forces created by the injection molding process.

In a continuing effort to improve the efficiency of the injection molding machine cycle of operation, the present invention proposes to increase the speed of operation of the clamp mechanism. Applicants have discovered one area for improvement with regard to the close clamp cycle, that being the operation of the clamp mechanism during the lockover portion of the cycle. Lockover is that portion of the clamp close cycle which is illustrated between positions 208 and 212 of FIG. 4a. After the molds have been closed, during lockover, the toggle is brought to its locked position which builds a predetermined clamping force to hold the molds together.

While it is desirable to maintain the highest possible lockover velocity, it is equally important that the toggle mechanism be brought to a stop without overshooting the lockover position. If the toggle mechanism actuator is a piston and cylinder, overshooting the lockover position will cause the piston to bottom on the cylinder not only potentially damaging the piston and cylinder mechanism, but also creating a disruptive and irritating banging noise. Depending on the toggle design, overshoot of the lockover position may also damage the toggle mechanism itself. In order to minimize the potential for damage to the toggle mechanism and its actuator, the toggle mechanism velocity during the lockover portion of the close clamp cycle is typically a relatively small velocity magnitude e.g. in a range of 10 to 20 percent of the maximum clamp velocity

SUMMARY OF THE INVENTION

The present invention provides a more efficient close clamp cycle of operation which utilizes a plurality of velocities during toggle lockover. By utilizing multiple velocities, the lockover cycle may be initiated at a relatively high velocity and terminated at a lower velocity. Consequently, control of the toggle mechanism is maintained as the toggle mechanism reaches its locked position thereby preventing any damage.

An advantage of such a cycle is that the average velocity of the clamp mechanism during the lockover phase of the cycle of operation is increased which, in turn, increases the efficiency of the cycle of operation of the machine.

In a preferred embodiment, the lockover portion of the cycle of operation is initiated at a high velocity, the magnitude of which is a function of the acceleration and deceleration of the toggle mechanism as well as the total displacement necessary to achieve a locked position. When the toggle mechanism is a predetermined distance away from the locked position, the velocity is reduced which permits the locked position to be achieved in a controlled manner.

Accordingly, it is an object of the present invention to provide a more efficient cycle of operation for an injection molding machine and to reduce the time required for the toggle mechanism to move from a mold touch position to a final locked position.

Further objects and advantages of the present invention shall become apparent from the accompanying drawings and the following description and the appended claims.

BRIEF DESCRIPTION OF THE DRAWINGS

FIGS. 1a and 1b are side views of an injection molding machine.

DETAILED DESCRIPTION

Figure 2:
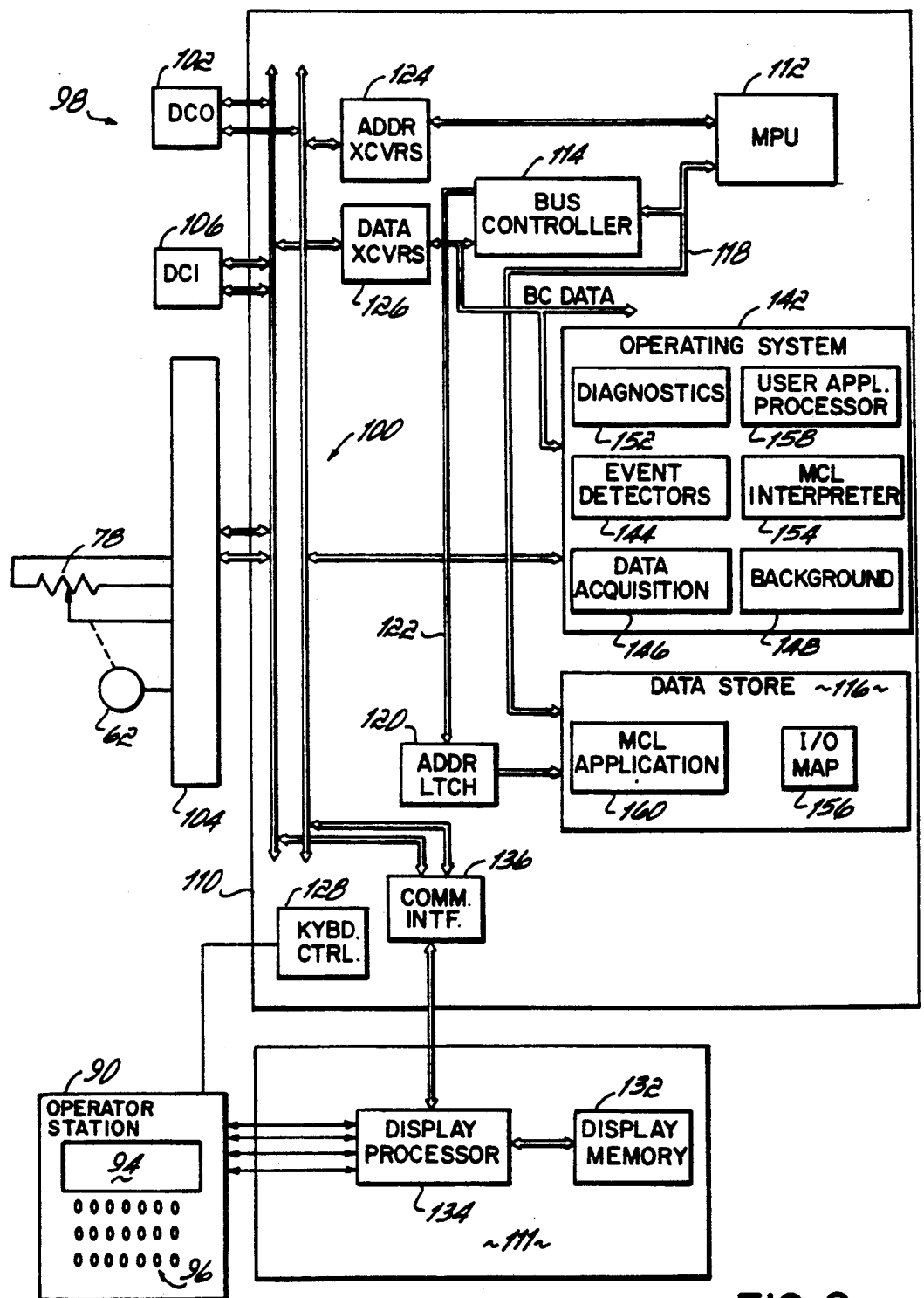
FIG. 2 is a block diagram of a machine control applied to the machine of FIG. 1.

Referring now to the drawings and particularly to FIGS. 1a and 1b thereof, there is shown an injection molding machine 10 that includes an injection system 12 and a clamp 14 which includes a toggle mechanism 16. The injection system is not illustrated in detail, and the structure and operation of the injection system may be one of any number of types that are well known to those who are skilled in the art.

Clamp 14 includes a stationary platen 18 that is secured to a suitable machine base 20, and it also includes a movable platen 22 that is slidably supported for movement along four parallel guide rods or tie bars 24 that extend outwardly from stationary platen 18 toward toggle mechanism 16. Stationary platen 18 carries a stationary mold element 26 and movable platen 22 carries a movable mold element 28. Movable mold element 28 is cooperable with stationary mold element 26 to define one or more mold cavities 30 that receive molten plastic material. The molten plastic material is heated and softened in injection system 12 and is then injected into mold cavity 30 to form a molded part.

In FIG. 1a, the clamp 14 is shown in a closed position in which the toggle mechanism 16 is in its locked position, and the mold elements 26 and 28 are closed under a predetermined clamping force. While in FIG. 1b, the clamp system is shown in an open position in which the mold halves are shown separated from each other.

Clamp 14 is adapted to move movable platen 22 toward and away from stationary platen 18 and to hold mold elements 26 and 28 tightly together during the time molten plastic material is injected into the mold cavity. As shown, clamp 14 includes a clamp support or die height platen 34 that is spaced from movable platen 22 along the longitudinal axis of the machine. Die height platen 34 is supported on base 20 of the machine and is slidable therealong on ways or wear plates 36. Guide rods 24 which extend from stationary platen 18 extend through suitable openings formed in clamps for platen 34 so that threaded ends 38 of guide rods 24 can be threadedly connected with respective nuts 40 that are rotatably carried on the rear face of clamp support platen 34.

Extending between die height platen 34 and movable platen 22 is a toggle mechanism 16 that extends between pairs of upper and lower die height platen yokes 44 and corresponding pairs of upper and lower movable platen yokes 46 that are longitudinally spaced from the yokes 44 in the direction of the longitudinal axis of the machine. The toggle mechanism 16 includes first links 47 that extend from yokes 44 and are pivotally connected therewith through respective pivot pins 48. The other ends of first links 47 are pivotally connected with respective second links 50 through pivot pin 52. The second links 50 are also pivotally connected through pivot pins 54 with movable platen yokes 46. As shown in FIGS. 1a and 1b, the toggle mechanism 16 is in the form of a double toggle arrangement including both an upper toggle linkage and a lower toggle linkage with each toggle linkage being the mirror image of each other relative to the machine longitudinal axis.

Extending inwardly toward the machine longitudinal axis from respective pivot pins 52 when the toggle links are extended as shown in FIG. 1a are respective cross head links 56 that are pivotally connected with the toggle cross head 58 through pivot pin 60. Cross head 58 is movable toward and away from die height platen 34 by means of a hydraulic cylinder (clamp actuator) 62, the outer end of rod portion 64 of which is connected to cross head 58. Additionally, cross head 58 is guided for movement along two parallel cross head support rods 66 that are secured to and extend outwardly from die height platen 34 and that terminate in respective guide support members 68. Actuation of toggle cross head 58 operates to open and close the clamp system thereby actuating respective toggle links 47, 50 and 56 to cause the first mold element 28 mounted on movable platen 22 to be moved toward and away from the second mold element 26 mounted on the stationary platen 18.

FIG. 2 is a block diagram of a control that may be applied to the injection molding machine of FIGS. 1a and 1b. Control 98 includes a processor module 110 to which are connected interface modules such as, for example, output interface module 102, input interface module 106, and analog I/O interface 104. Processor module 110 executes machine control application programs 160 which define a machine cycle of operation for production of molded articles. A display processor 134 within a display control 111 is responsive to application programs in display memory 132 and executes those programs to perform display functions associated with display 94.

Control of the operation of machine actuators is performed by analog I/O interface 104 in response to set point signals produced by processor module 110 by execution of application programs 160. The position of mechanisms connected to machine actuators may be measured by, for example, potentiometers and the like, such as position sensing potentiometer 78 shown in FIG. 2 which produces a feedback signal representing toggle cross head position from which the position of movable platen 26 is derived. Velocity of the toggle mechanism 16 may be derived from the cross head position feedback signal.

Operation of devices associated with machine 10 which are controlled by binary control signals i.e., ON/OFF control signals, is effected through output interface modules such as, for example, DC output interface module 102. Binary status signals may be produced in response to the binary control signals applied to output interface modules as well binary input signals produced by devices connected to binary input interfaces such as, for example, DC input interface module 106. Each of the modules 102, 104, and 106 are electrically connected to processor module 110 via a bus 100 over which are conducted data, address and bus control signals.

Machine control application programs 160 are stored in memory 116. These programs are executed by microprocessor 112 under control of operating system programs recorded in read-only-memory (ROM) 142. Data is transferred between the internal data bus of microprocessor 112 and memory 116 directly over local data bus 118. Memory data addresses are transferred over memory address bus 122 and latched at address latch 120. Memory address bus 122 and data and address lines of the expansion bus are controlled by bus controller 114. All data exchanges between microprocessor 112 and bus 100 are performed through bus controller 114. Bus controller 114 produces control signals for controlling the transfer of data over bus 100, provides buffering of a data bus signals produced by microprocessor 112, and incorporates: an interrupt controller; a real time clock generator; a direct memory access controller; a programmable interval timer; interface logic for a numeric coprocessor; and, interface logic for a keyboard controller.

Keyswitch signals produced by keyboard 96 of operator station 90 are interfaced to processor module 110 by a serial link connected to keyboard controller 128. Keyboard data is received in serial form and is made available at an eight bit data bus tied to the bus controller.

Operating system programs executed by microprocessor 112 include event detector programs 144, data acquisition programs 146, background programs 148, diagnostic programs 152, machine control interpreter programs 154 and user processor programs 158. Event detector programs 144 control continuous monitoring of selected signals, e.g. position, velocity and pressure signals; and event detector programs further control programmed responses to the detection of predetermined (trigger) conditions of those signals. Data acquisition programs 146 control periodic sampling of selected input signals for use in performing process monitoring under control of the machine control application programs. Diagnostic programs provide power on diagnostics of control system components, initialization of selected data values and initiation of system program execution. Background programs 148 provide data interfaces for user application programs as well as management of real time clock data produced by bus controller 114.

The injection molding machine illustrated in FIGS. 1a and 1b in combination with the control illustrated in FIG. 2 and their operation are representative of the VISTA line of injection molding machines with an XTL control commercially available from Cincinnati Milacron Inc.

Figure 3:
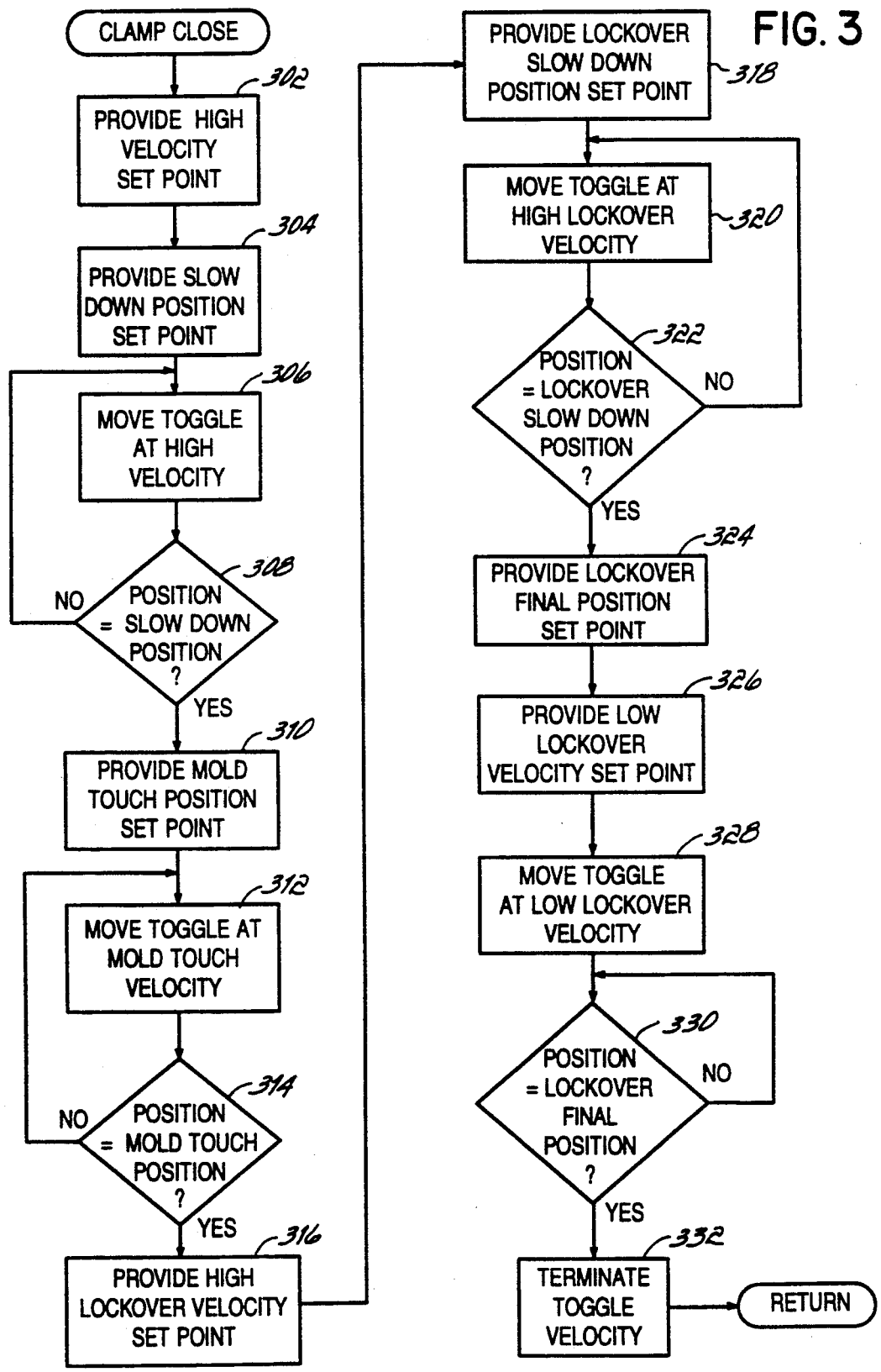
FIG. 3 is a flow chart illustrating a close clamp cycle utilizing the present invention.

FIG. 3 is a flow chart illustrating a clamp close operation embodying the present invention and may be implemented using the control of FIG. 2 on the injection molding machine of FIG. 1. During the clamp close cycle of operation, operation of clamp actuator 62 is subject to either control of velocity or control of force according to the position of the movable platen 22 relative to the fixed platen 18. Since the invention is independent of force control and the force control of the clamp does not change with this invention, only velocity control of the clamp will be discussed. The process of FIG. 3 will also be described with reference to FIG. 4b.

Figure 4A:
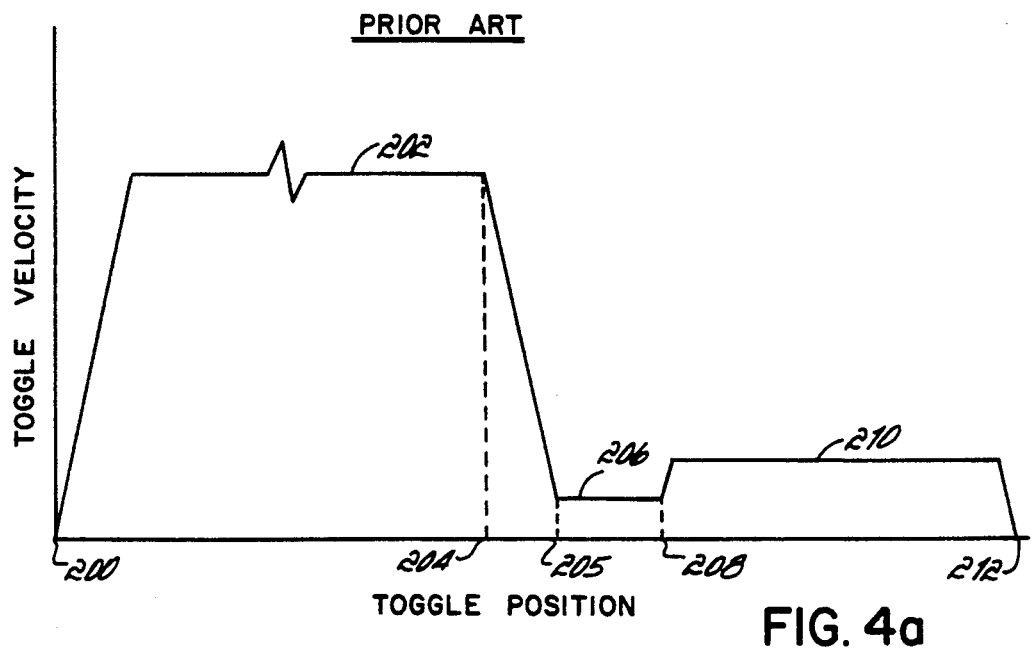
FIG. 4a is a graphical representation of the prior art close clamp cycle depicting toggle cross head velocity as a function of toggle cross head position.
Figure 4B:
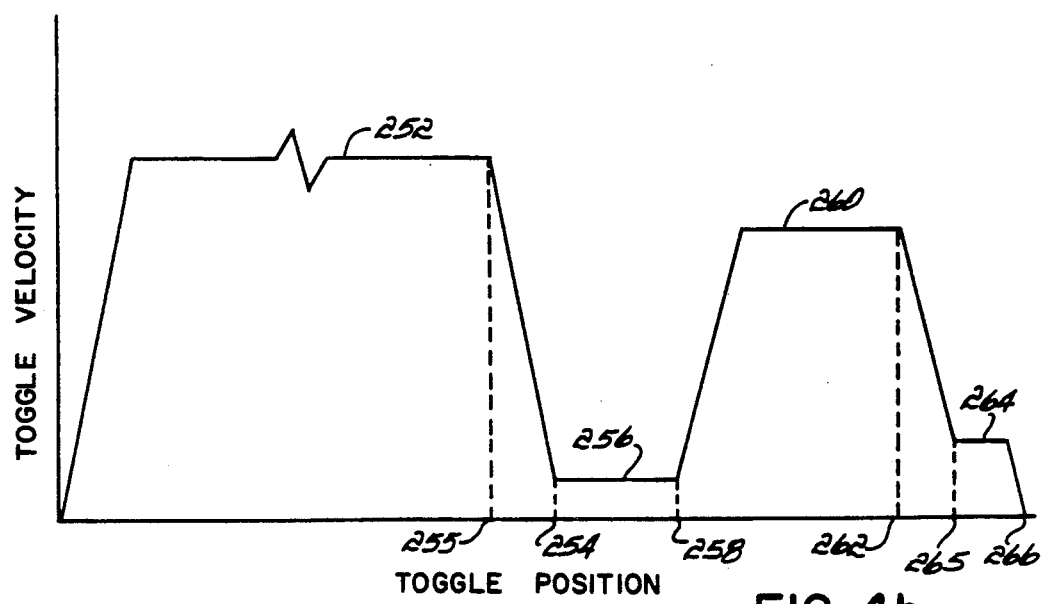
FIG. 4b is a graphical representation of a close clamp cycle utilizing the present invention depicting toggle cross head velocity as a function of toggle cross head position.

Referring to FIG. 3, at step 302, a high velocity set point signal is produced to the analog I/O interface 104 by the event detector 144 in response to the MCL application program 160 within the control 98 of FIG. 2. Similarly, at step 304, a slow down position set point signal is also activated. An analog signal is produced in response to the high velocity set point signal. Since a velocity feedback signal is not used, the analog signal is essentially an open loop command signal which is effective to open a hydraulic valve thereby porting hydraulic fluid to actuator 62. The cross head 58, the movable platen 22 and mold element 28 are then accelerated and moved at the high velocity pursuant to step 306. That velocity is shown at 252 in FIG. 4b. As illustrated in FIG. 4b, the analog I/O interface is effective to ramp the analog velocity signal to its desired value thereby providing an acceleration function to better control the motion of the movable platen.

By comparing a position feedback signal from the transducer 78 to the slow down position set point signal as shown in step 308, the analog I/O interface 104 detects when the toggle mechanism 16 reaches slow down position 254 of FIGS. 4b which is defined by the slow down position set point signal. Once again, preferably, the analog I/O interface 104 is utilized to provide a deceleration function. At position 254, pursuant to step 310, a mold touch position set point replaces the slow down position set point signal. During this portion of the cycle, the toggle mechanism moves the mold element on the movable platen into contact with the mold element on the stationary platen. Therefore, it is desired that the clamp move at a mold touch velocity, i.e. a velocity such that inadvertent mold contact will not damage the molds or machine. The mold touch velocity may be established during a test cycle and is preferably set by the machine manufacturer rather than being a user programmed variable. As shown in FIG. 4b, the toggle mechanism is decelerated from a high velocity 252 to a mold touch velocity 256. In applicant's preferred embodiment, a mold touch velocity is determined by the analog I/O interface 104; and the interface 104 detects a position 255 at which to begin a deceleration to the such that when the toggle mechanism reaches the slow down position, it is moving at the mold touch velocity as required in step 312. Alternatively, the mold may be decelerated to the mold touch velocity after the toggle mechanism reaches the slow down velocity in response to a velocity set point signal. Pursuant to step 314, the analog I/O interface 104 detects when the toggle mechanism moves the mold element 28 to the mold touch position at which point the mold elements 26 and 28 are in contact. That position is shown at 258 in FIG. 4b.

The next step in the cycle is to increase the clamping force between the mold elements while bringing the toggle mechanism to its locked position. A high lockover velocity set point signal is produced per step 316; and in step 318, a lockover slow down position set point signal is provided. Step 320 requires that the toggle mechanism accelerate and move at the high lockover velocity. Consequently, as shown in FIG. 4b, the toggle mechanism is accelerated to a high lockover velocity as shown at 260.

In step 322, the control detects when the toggle mechanism reaches the lockover slow down position as shown at 262 in FIG. 4b. At that point, a lockover final position set point defining a locked position of the toggle mechanism is generated by step 324, and a low lockover velocity set point is produced per step 326. The toggle mechanism is then decelerated to the low lockover velocity and moved at that velocity as defined by step 328 and shown at 264 in FIG. 4b. Per step 330, analog I/O interface determines when the toggle mechanism reaches the lockover final position shown at 266 in FIG. 4b, and the clamp velocity is terminated in step 332. The velocity of the toggle mechanism during the lockover phase is a time weighted average of the high and low lockover velocities. Hence, during the lockover cycle, by using the plurality of velocities as illustrated in FIG. 4b versus the single velocity of FIG. 4a, the average velocity is higher; and therefore, the toggle mechanism cross head may be brought its final position more quickly but in a controlled manner without damage to the machine or cylinder 62.

Preferably, the velocity and position set points utilized in the lockover cycle are set by the machine manufacturer as opposed to being user programmed set points. The velocity profile during lockover may be defined in terms of the following considerations. A first displacement may be defined from the position 265 of FIG. 4b at which the low lockover velocity is effective to the lockover final position. The velocity magnitude effective during the first displacement is such that the cross head may be decelerated from the low lockover velocity to zero without damage to the toggle mechanism 16 or the actuator 62. A remaining or second displacement of the toggle mechanism is equal to the total displacement from the mold touch position 258 of FIG. 4b to the lockover final position 266 less the first displacement. It is desired that the toggle mechanism move at a high velocity when traversing the second displacement. However, the maximum desirable velocity is a function of magnitude of the second displacement, the size and mass of the toggle mechanism and the load thereon, the design of the toggle mechanism, etc..

Applicants' believe that it is within the spirit and scope of the claimed invention to utilize additional velocity transitions or other velocity profiles to reduce the time required to execute the lockover phase of the clamp close operation. Further, the invention is not limited in application to the double toggle design shown in FIG. 1a but is applicable to other toggle designs, e.g. a single toggle. Applicants prefer that the high lockover velocity be set such that the toggle mechanism may accelerate to that velocity and maintain that velocity over a significant portion of the second displacement.

While the invention has been illustrated in some detail according to the preferred embodiments shown in the accompanying drawings, and while the preferred embodiments have been described in some detail, there is no intention to thus limit the invention to such detail. On the contrary, it is intended to cover all modifications, alterations and equivalents following within the spirit and scope of the appended claims.

What is claimed is:

1. A method effected prior to injecting molten plastic material into a mold for controlling motion of a toggle mechanism coupled to a first mold element on a molding machine, said toggle mechanism being operative to move from an open position at which the first mold element is separated from a second mold element to a locked position at which the mold elements are in contact, the method comprising the steps of:
    a. moving the toggle mechanism from the open position at a rapid velocity;
    b. decelerating the toggle mechanism to a second velocity less than the rapid velocity in response to the first mold element being a predetermined distance from contact with the second mold element;
    c. accelerating the toggle mechanism to a third velocity greater than the second velocity in response to the first mold element being in contact with the second mold element; and
    d. decelerating the toggle mechanism to a velocity approximately equal to the second velocity in response to the toggle mechanism being a predetermined distance from the locked position.

2. A method effected prior to injecting molten plastic material into a mold for controlling motion of a toggle mechanism on an injection molding machine, said toggle mechanism being mechanically coupled to and moving a first mold element into a contacting relationship with a second mold element, the method comprising the steps of:
    a. producing a rapid velocity signal and a slowdown position signal;
    b. operating the toggle mechanism to move the first mold element toward the second mold element at a rapid velocity in response to the rapid velocity signal;
    c. producing a feedback signal representing toggle mechanism position;
    d. detecting a toggle mechanism position being equal to a position defined by the slowdown position signal;
    e. operating the toggle mechanism to move the first mold element toward the second mold element at a mold touch velocity;
    f. detecting contact between the mold elements;
    g. producing a high lockover velocity signal and a lockover position signal;
    h. operating the toggle mechanism in response to the high lockover velocity signal;
    i. detecting a toggle mechanism position being equal to a position defined by the lockover position signal;
    j. producing a low lockover velocity signal and a final lockover position signal;
    k. operating the toggle mechanism in response to the low lockover velocity signal;
    l. detecting a toggle mechanism position being equal to a position defined by the final lockover position signal; and
    m. terminating motion of the toggle mechanism.

3. A method effected prior to injecting molten plastic material into a mold for minimizing the time required to move a toggle mechanism through a total displacement from an initial position at which mold elements are in initial contact to a final position at which the toggle mechanism is in a final locked configuration, said total displacement being comprised of a first displacement required to decelerate the toggle mechanism from a low lockover velocity to a zero velocity without causing damage to the machine and a second displacement representing the difference between the total and first displacements, the method comprising the steps of:
    a. producing a high lockover velocity signal representing a velocity to which the toggle mechanism may be accelerated during motion through the first displacement;
    b. moving the toggle mechanism at the high lockover velocity through the second displacement;
    c. producing a low lockover velocity signal representing a velocity from which the toggle mechanism may be decelerated to a zero velocity during travel through the first displacement without causing damage to the machine; and
    d. moving the toggle mechanism at the low lockover velocity through the first displacement.

4. The method of claim 3 wherein after the step of moving the toggle mechanism at the high lockover velocity, the method comprises the step of decelerating the toggle mechanism from high lockover velocity to the low lockover velocity.

5. A method effected prior to injecting molten plastic material into a mold for moving a toggle mechanism of a clamp on an injection molding machine from a mold touch position at which mold elements mounted on the clamp are in initial contact to a locked position at which the toggle mechanism is in a locked position, the method comprising the steps of:
    a. producing a rapid lockover velocity signal and lockover slowdown position signal;
    b. moving the toggle mechanism at a velocity represented by the rapid lockover velocity signal;
    c. producing a feedback signal representing a position of the toggle mechanism;
    d. detecting a toggle mechanism position being approximately equal to a position represented by the lockover slowdown position signal;
    e. producing a final lockover velocity signal and a final lockover position signal;
    f. moving the toggle mechanism at a velocity represented by the final lockover velocity signal; and
    g. terminating motion of the toggle mechanism in response to the position of the toggle mechanism being approximately equal to the position defined by the final lockover position signal.

* * * * *